(12) United States Patent
Eklind

(10) Patent No.: US 7,695,184 B2
(45) Date of Patent: Apr. 13, 2010

(54) APPARATUS AND METHOD FOR STIRRING AND MIXING OF BEVERAGES

(75) Inventor: Evert Eklind, Mariestad (SE)

(73) Assignee: Nestec S.A., Vevey (CH)

( * ) Notice: Subject to any disclaimer, the term of this patent is extended or adjusted under 35 U.S.C. 154(b) by 883 days.

(21) Appl. No.: 10/598,672

(22) PCT Filed: Mar. 4, 2005

(86) PCT No.: PCT/EP2005/002301

§ 371 (c)(1),
(2), (4) Date: Sep. 7, 2006

(87) PCT Pub. No.: WO2005/089922

PCT Pub. Date: Sep. 29, 2005

(65) Prior Publication Data

US 2008/0165615 A1    Jul. 10, 2008

(30) Foreign Application Priority Data

Mar. 10, 2004  (SE) .................................. 0400618

(51) Int. Cl.
*B01F 13/08* (2006.01)
*B01F 15/02* (2006.01)
(52) U.S. Cl. ...................... 366/138; 366/165.1; 366/273
(58) Field of Classification Search ................. 366/273, 366/138, 165.1
See application file for complete search history.

(56) References Cited

U.S. PATENT DOCUMENTS

| 1,242,493 | A |  | 10/1917 | Stringham |  |
| 3,900,186 | A |  | 8/1975 | Balas |  |
| 4,465,377 | A |  | 8/1984 | de Bruyne |  |
| 4,596,779 | A | * | 6/1986 | Ono | ......................... 435/297.3 |
| 4,649,118 | A | * | 3/1987 | Anderson | ................. 435/297.3 |
| 5,529,391 | A | * | 6/1996 | Kindman et al. | ............. 366/145 |
| 2008/0165615 | A1 | * | 7/2008 | Eklind | ......................... 366/138 |

FOREIGN PATENT DOCUMENTS

| EP | 0373126 A1 | 6/1990 |
| EP | 1155646 A1 | 11/2001 |
| GB | 1367354 | 9/1974 |
| WO | WO03092852 | 11/2003 |

OTHER PUBLICATIONS

Patent Abstracts of Japan—Publication No. 62294430, Publication Date Dec. 21, 1987, Title: Stirring Apparatus, 1 page abstract, with JP 62-294430 document, total 8 pages.
Koh et al. article entitled "Development of Jet Mixer With Rotating and Up-And-Down Moving Nozzles" Journal of Chemical Engineering of Japan 23 Oct. 1990, No. 5, pp. 632-634.

* cited by examiner

*Primary Examiner*—Tony G Soohoo
(74) *Attorney, Agent, or Firm*—K&L Gates LLP

(57) ABSTRACT

The present invention relates to drink-stirring device for stirring or mixing liquid and/or powdered ingredients with liquid in a drinking vessel (4), the liquid being supplied from above through the stirring device to an outlet tube which conducts at least one liquid jet towards the interior of the drinking vessel. The liquid is supplied through an outlet tube (64) which is rotatably attached to the device and is associated to an external, magnetic member (82). The electromagnet arrangement is arranged outside or at distance of the magnetic member for creating a variable magnetic field configured to move the tube (64) in rotation, so that the emerging liquid jet can be given a corresponding centrifugal effect.

9 Claims, 5 Drawing Sheets

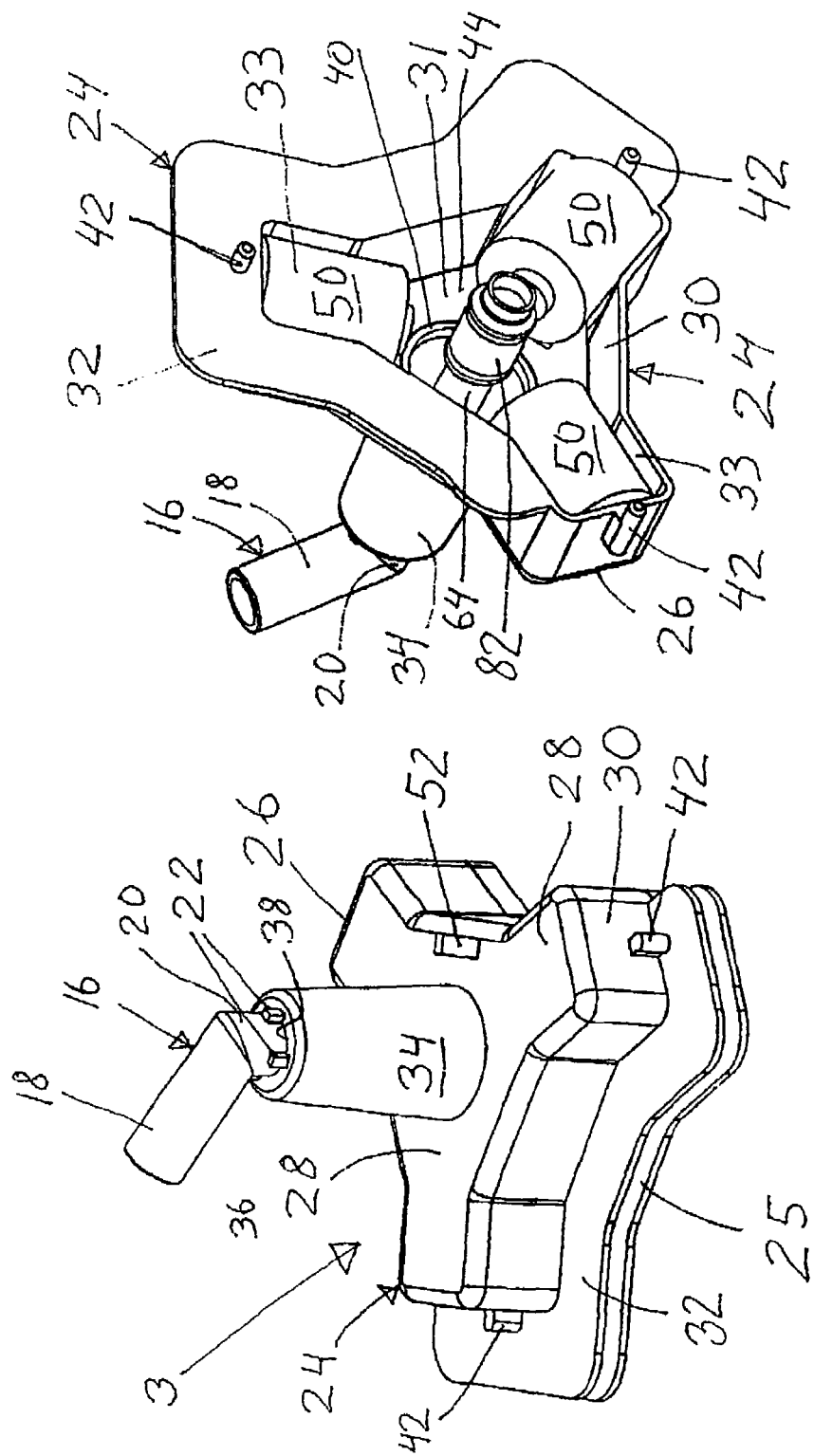

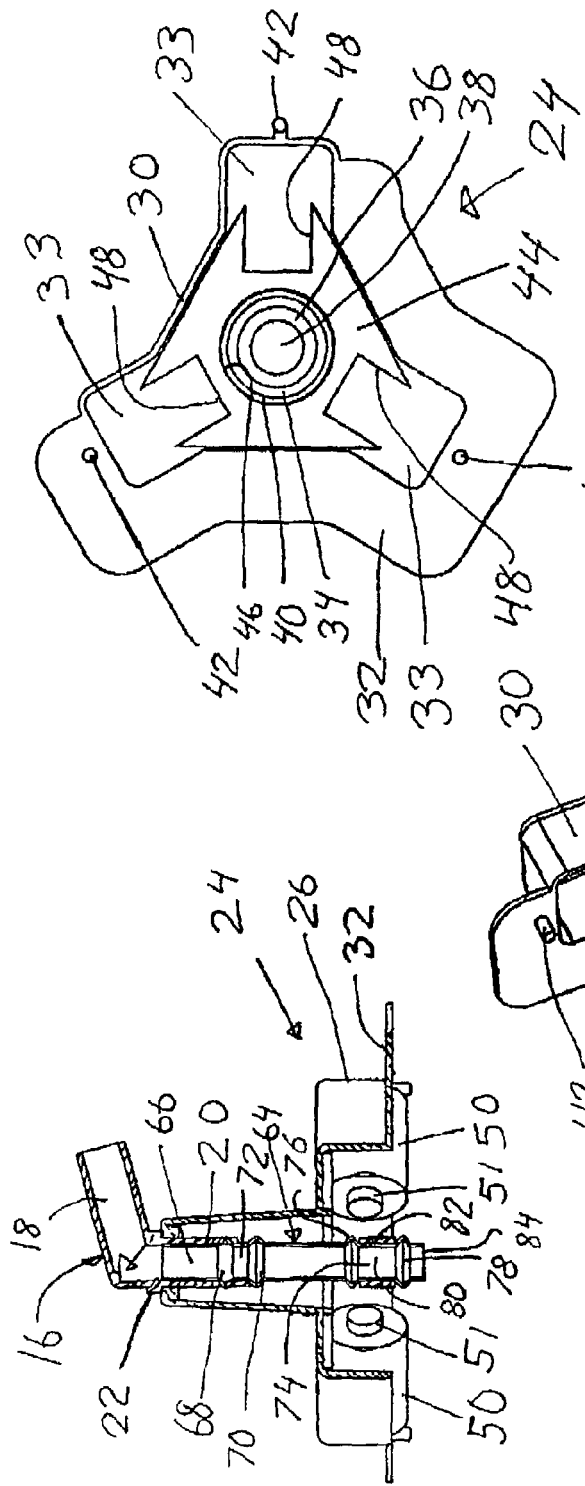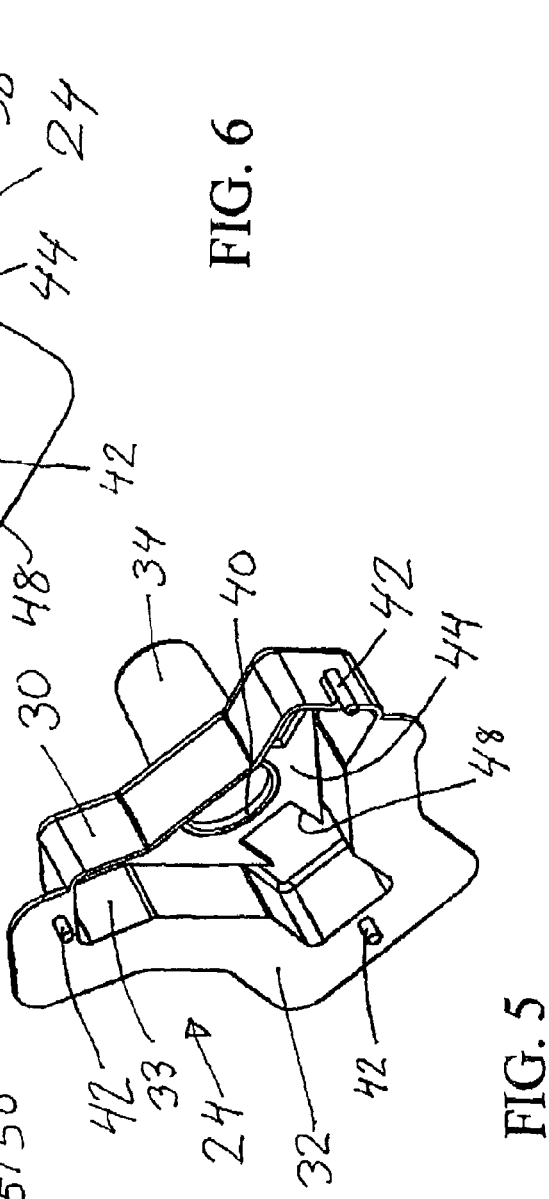

APPARATUS AND METHOD FOR STIRRING AND MIXING OF BEVERAGES

BACKGROUND

The present invention relates to a drink-stirring device for stirring or mixing liquid and/or powdered ingredients with liquid in a drinking vessel. The invention also relates to a method for stirring, and eventually foaming, a liquid in a drinking vessel. Stirring devices of this kind are used in apparatus for the retail sale of drinks consisting of a usually hot liquid and liquid or powdered concentrate.

It has often been difficult for previously known stirring devices to bring about satisfactory mixing of the other ingredients with the liquid. Particular problems arise when it is desirable to bring about frothing of liquid, for example when preparing cappuccino. This is usually carried out now by frothing milk in a separate vessel. This vessel has to be washed several times a day for reasons of hygiene. EP 1 197 145 describes a device for frothing milk for preparing cappuccino consisting of a tubular device with a through-spindle with stirring blade, an inlet for steam at the top and inlet openings for air and milk along the tube. This is an expensive and complicated stirring device of great overall height, and furthermore it cannot prepare the whole drink but only the milk froth. It is generally the case that two stirring devices are required for making cappuccino.

It is known to use permanent magnets in mixing vessels, these magnets being caused to rotate by means of an outer rotating or pole-changing magnetic field. WO 85/05046 discloses such a device comprising a mixing vessel with a bottom outlet. Arranged round the lower edge of the vessel is a closed iron core with a number of electric coils connected to an alternating current source, which can produce magnetic fields of varying frequency and strength. The device is used especially for mixing in connection with chemical processes.

EP 0 285 210 describes a drink mixer comprising a tube-like mixing vessel with a bottom outlet. Arranged in the mixing vessel is a mixer blade, which has at the bottom a magnetic member in the form of a permanent magnet. Arranged outside the vessel is an electromagnet, which can set the mixer blade in rotating and/or vibrating motion. The mixer blade is exposed in the mixing vessel and can easily be lifted out for cleaning. Cleaning nevertheless remains a laborious and time-consuming operation. The mixer blade can be provided with slits in order to bring about frothing of the drink, for example when preparing cappuccino. Cleaning is then even more laborious.

EP 1 155 646 discloses a device for preparing a drink in a cup, into which powdered ingredients have first been introduced. Liquid for diluting the drink is supplied through a distributing head arranged on a vertical hollow shank attached to a drive wheel. At the top, the shank is connected to an inlet tube via a freely rotatable coupling. The distributing head comprises a diagonally extending connecting line, which leads to two opposite, eccentrically positioned, downwardly directed distributing nozzles. The drive wheel is arranged in a gearbox and is driven by an electric motor.

This device has a number of disadvantages. It comprises an extra motor and a mechanical transmission to the distributing head via gearwheels. This leads to wear and a risk of breakdown. The freely rotating connection between the tube and the hollow shank is also subjected to wear and, over time, suffers liquid leakage. The winding liquid passages in the distributing head are also difficult of access for cleaning, and scale can be expected to be deposited in these.

SUMMARY

The object of the invention is therefore to produce a drink-stirring device comprising a distributing head intended to mix diluting liquid with other ingredients in the drinking vessel itself, which device has a simple and easy-to-clean construction, does not contain any moving parts in the liquid duct, has a small overall height and has few moving parts. It is also to be possible for the device to be used for preparing different kinds of drink with different requirements for stirring during preparation. Another object of the invention is also to indicate a method for the said device for drink preparation, which makes preparation of both frothy and non-frothy drinks possible in the same device. A further object of the invention is to indicate a use of the stirring device for preparing cappuccino and other frothy drinks without using a separate preparation device for frothing milk or other liquid.

These objects are achieved by virtue of a drink-stirring device for stirring or mixing liquid and/or powdered ingredients with liquid in a drinking vessel, the liquid being supplied from above through the stirring device to an outlet tube which conducts at least one liquid jet towards the interior of the drinking vessel. The liquid is supplied through an outlet tube. The outlet tube is rotatably attached to the device. The outlet tube is associated to an external, magnetic member. An electromagnet arrangement is arranged outside or at a distance of the magnetic member for creating a variable magnetic field configured to move the outlet tube in rotation. This particular arrangement provides the liquid jet a corresponding centrifugal effect that promotes mixing and/or frothing of the liquid in the vessel. This arrangement is so particularly effective for stirring and frothing a liquid in a drinking vessel. This arrangement also promotes a more hygienic delivery and more hygienic stirring of the drink with reduced contact of the system with the liquid; therefore, requiring less cleaning. This arrangement is also less cumbersome.

The invention also relates to a method for stirring a liquid in a drink vessel characterized in that the liquid is conducted through a liquid delivery outlet tube which is rotatable so that the emerging liquid jet can be given a corresponding centrifugal effect.

In a possible mode of the method, the speed of rotation of the outlet tube is adjustable by a control unit. Preferably, the rotation of the outlet tube is adjusted at variable speeds as function of the type of drink prepared. This provides the advantage to adjust the pattern of liquid jet to the type of drink being prepared and, in particular, to adjust the amount of foam, for example, for cappuccino drinks.

BRIEF DESCRIPTION OF THE FIGURES.

The invention will now be described with the aid of a non-limiting illustrative embodiment and with reference to the accompanying drawing, in which

FIG. 2 shows a view at an angle from above of a stirring device according to the invention;

FIG. 3 shows a view at an angle from below of the device in FIG. 2 shown without bottom plate;

FIG. 4 shows a sectional vertical view of the device in FIGS. 2 and 3;

FIG. 5 shows a view at an angle from below corresponding to FIG. 3 showing only the housing of the device and a support plate;

FIG. 6 shows a view directly from below of the housing in FIG. 5;

DETAILED DESCRIPTION

Figure 1:
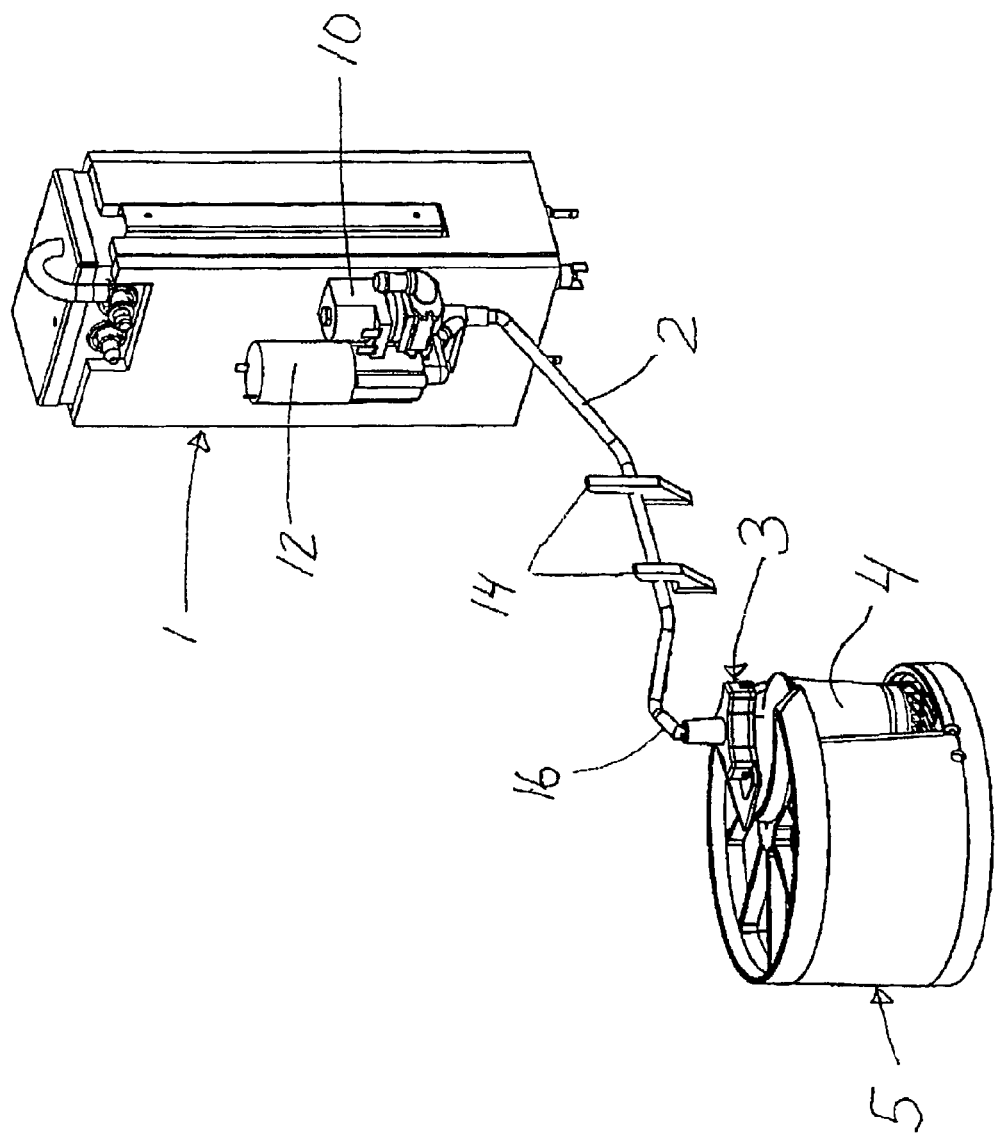
FIG. 1 shows a diagrammatic view of a drink-making system comprising a stirring device according to the invention shown without encasement, cup magazine and other peripheral equipment.

FIG. 1 shows a drink preparation system forming part of an apparatus for the retail sale of drinks. For reasons of clarity, only the actual drink preparation system has been shown and not other peripheral equipment and installation components. The system consists of a liquid tank 1, a connecting tube 2, a stirring device 3, which opens above a cup 4 arranged in a cup presenter or cup feed unit of carousel type 5. The cup presenter is supplied with cups from a magazine (not shown), which cups are then fed under the stirring device 3 after first having had powdered drink ingredients introduced. The powder supply can take place either before the carousel or in a carousel position before the liquid supply.

The liquid tank comprises a heating device and has on the outside a valve device 10. Arranged with the valve device 10 is a pump 12, which presses the previously measured or defined liquid quantity into the tube 2. The tube runs via tube holders 14, only two of which are shown, to an inlet pipe 16 arranged on the stirring device 3. The pipe 16 is goose-necked and has an inlet part 18 connected to the tube 2 and an outlet part 20 having stop projections 22, which limit the depth to which the outlet part can penetrate the stirring device 3. The overall height of the drink preparation system is reduced by virtue of the inlet pipe being goose-necked.

The stirring device 3 has a housing 24 and a bottom plate 25. The housing 24 consists of a surrounding casing 26 with a top 28 and a wall 30 and also a plate or flange 32 projecting from the lower part of the casing. Projecting upwards from the top 28 is a centrally located, conical neck 34, which is terminated at the top by an inwardly directed flange 36 surrounding a central hole 38 for the inlet pipe 16. The maximum downward penetration depth of the pipe 16 is limited by the stop projections 22 on the outlet part 20. At the opposite end, the neck 34 is terminated by an annular flange 40 projecting into the housing. The surrounding wall 30 encloses a central part 31 and three magnet spaces 33 projecting from this. The housing 24 also has on the wall 30 assembly attachments 42 in the form of guide pins, which are intended to be fastened in corresponding holes 58 in the bottom plate, and which can receive assembly screws (not shown) for holding the parts together.

FIGS. 5 and 6 show the housing 24 with the magnets removed. A triangular support plate 44 in the form of a circuit board is arranged in the housing. The support plate has a central hole 46, which surrounds the position-defining, annular flange 40. The support plate 44 has cutouts 48 in the triangle vertices, which serve as seats for electromagnets 50. The electromagnets are connected via lines (not shown) to the circuit board plate 44. Control signals and power are supplied to the electromagnets by lines (not shown), which pass through a hole 52 in the housing 24.

Figure 7:
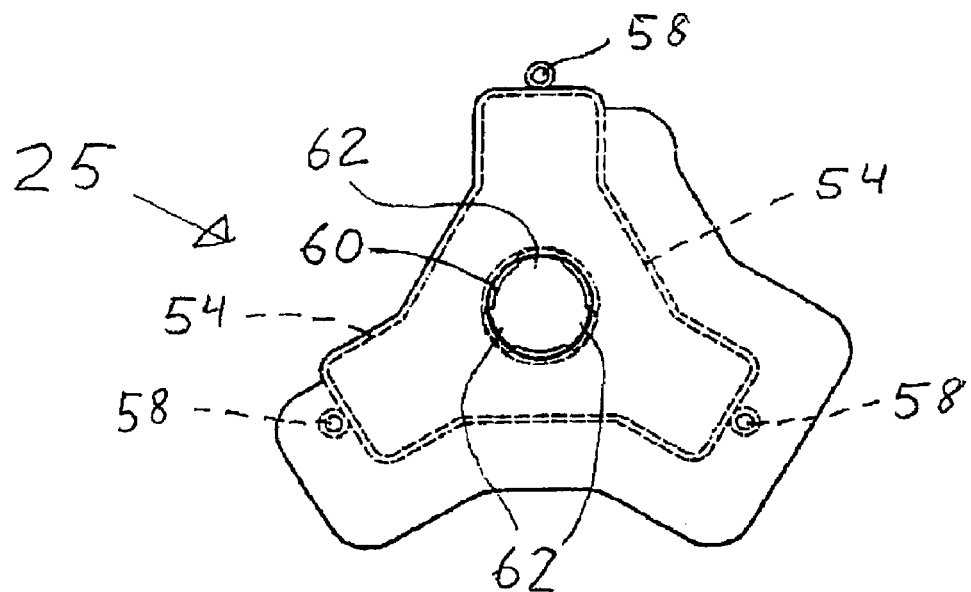
FIG. 7 shows a plan view from below of a bottom plate belonging to the device in FIG. 2.
Figure 8:
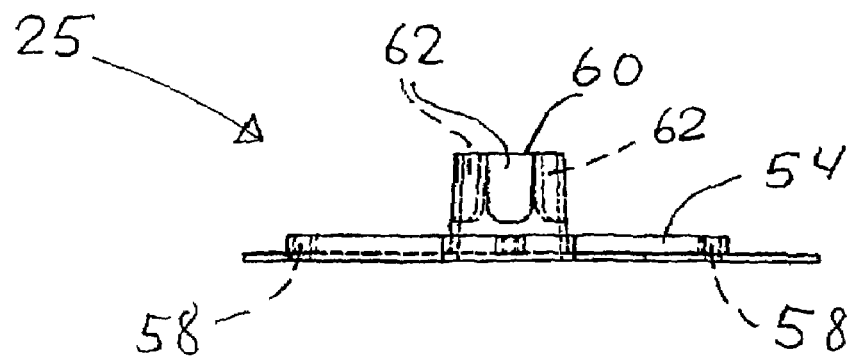
FIG. 8 shows a side view of the bottom plate in FIG. 7.
Figure 9:
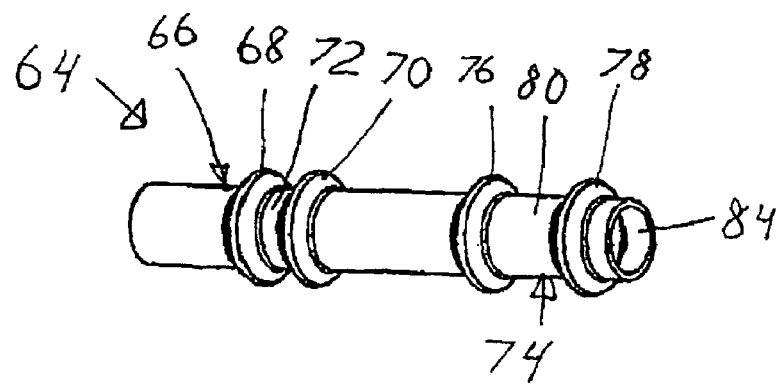
FIG. 9 shows a side view of an outlet tube forming part of the stirring device.
Figure 10:
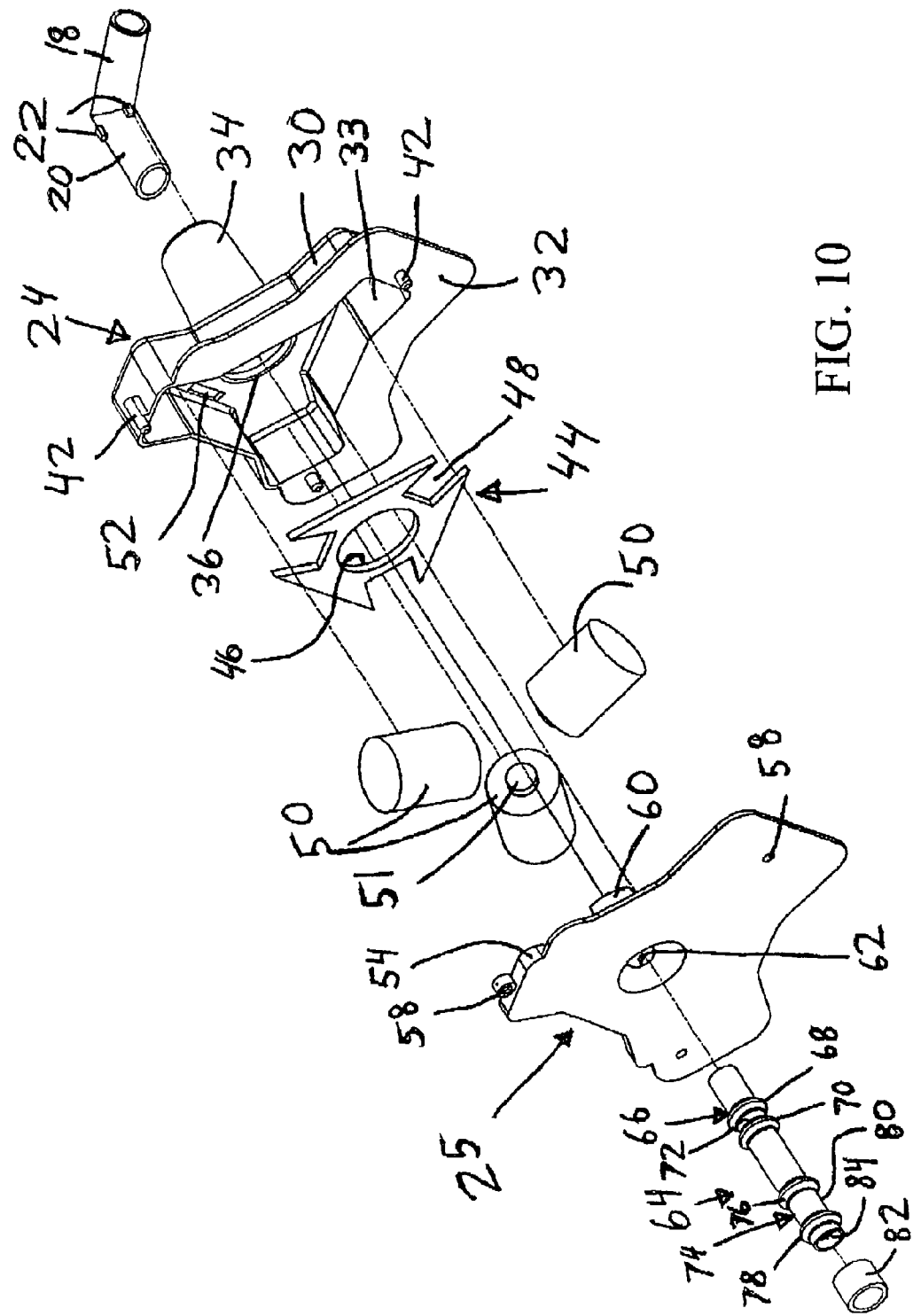
FIG. 10 shows an exploded diagram of the stirring device in FIGS. 2-9.

The bottom plate 25 shown in FIGS. 7 and 8 has a support edge 54 intended to bear against the housing casing 26 and surround three magnet spaces 56. The bottom plate has in its centre a conical neck 60, which projects into the annular flange 40. The neck 60 also has cutouts 62 for the iron cores 51 of the electromagnets 50.

The angled pipe 16 is connected to an outlet tube 64 and is pushed onto the outside of it. The outlet tube 64 has at its upper end 66 two annular beads 68 and 70 with an intermediate region 72. The outlet part 20 of the angled pipe is intended to be guided over the outlet tube and over the first bead 68 into contact with the second bead 70, which serves as a stop. The position of the outlet tube in the longitudinal direction is thus defined. Arranged at the lower, outlet end 74 of the outlet tube are two further external beads 76, 78 enclosing a wider intermediate region 80 which receives a ring 82 made of ferromagnetic material located on the outside. This ring is located at the same level as the electromagnets 50. The material of the ring should be such that it does not become permanently magnetized after having been located in a magnetic field, for example transformer sheet or the like. The outlet tube is suitably made from silicone material, which is especially suitable for handling foodstuffs.

During use of the stirring device, the electromagnets are activated in turn round the arrangement at the speed corresponding to the desired mixing intensity. The outlet end 74 of the outlet tube 64 and its mouth 84 will then move along an approximately circular path, and the emerging liquid jet will describe a corresponding, closed, approximately circular path in the cup. This movement is made possible by virtue of the neck 34 surrounding the outlet tube and its extension in the neck 60 projecting upwards from the bottom plate having a downwardly increasing width. By virtue of the liquid jet moving over the cup bottom and then round the cup contents, the powdered concentrate will be whirled up and dissolved in the liquid.

Depending on the properties of the drink mixed, the speed or frequency of the tube mouth can be varied.

The device is especially advantageous for preparing cappuccino, in which connection it is possible to prepare this drink in the drinking vessel itself starting from powdered ingredients and hot water and using a single mixing device.

The invention is not limited to the illustrative embodiment shown but can be varied arbitrarily within the scope of the inventive idea as defined by the patent claims which follow. In particular, use can be made of liquid concentrate instead of powder. It is also possible to make drinks other than coffee, for example tea, chocolate and cold drinks such as fruit syrup and water. Furthermore, use can also be made of more than three electromagnets, or the ring made of non-permanent magnetic material can be replaced by a magnetic member. The stirring device can also comprise more than one liquid line, which lines are moved round simultaneously by the electromagnets. This may be for syrup and water, for example. The concentrated liquid to be dissolved is then suitably introduced at the beginning of the mixing cycle or even before it. The invention is not limited to the use of drinking vessels in the form of disposable cups either but can be used together with any drinking vessel, for example one's own coffee mug.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A drink-stirring device comprising an outlet tube for conducting at least one liquid jet towards an interior of a drinking vessel, the liquid is supplied through the outlet tube, the outlet tube being rotatably attached to a stirring device and including a magnetic member on an exterior of the outlet tube, and an electromagnet arrangement positioned outside the magnetic member for creating a variable magnetic field configured to rotate the outlet tube, the electromagnet arrangement comprises at least three electromagnets enclosed in a housing having a surrounding casing and a bottom plate, and the housing and the bottom plate have upwardly conically tapering necks, which together form a through-passage for the outlet tube, one pole of each electromagnet is directed towards the magnetic member, and the electromagnets are arranged so as to be activated cyclically in turn by electronics on a circuit board.

2. The device according to claim 1, wherein the magnetic member is a non-permanent-magnetic iron ring located between two beads on a lower end of the outlet tube.

3. The device according to claim 1, wherein the circuit board comprises a support plate surrounded by the housing, which plate has cutouts intended to hold the electromagnets in position, and the electronics provide control and a power supply for the electromagnets.

4. The device according to claim 1, wherein the outlet tube is connected to a goose-necked inlet pipe, which is located in a seat on the housing, an upper end of the outlet tube being at least essentially fixed in a radial direction.

5. A method for stirring and eventually foaming a liquid in a vessel, the method comprising the steps of:
    passing the liquid through a liquid delivery outlet tube (64) which i~ the outlet tube rotatable at a determined speed so that an emerging liquid jet is provided with a corresponding centrifugal effect;
    providing a magnetic member on an exterior of the outlet tube; and
    locating an electromagnet arrangement outside the magnetic member to create a magnetic field configured to drive the magnetic member and tube together in rotation;
    wherein the electromagnet arrangement consists of at least three electromagnets, one pole of which is directed towards the magnetic member, and activating the electromagnets in turn to cause a mouth of the outlet tube to move along an approximately circular path and the emerging liquid jet to describe a corresponding closed path in the drinking vessel.

6. The method according to claim 5, comprising the step of supplying the liquid under pressure using a pump.

7. The method according to claim 6, wherein the rotation of the outlet tube is adjusted at variable speeds as function of the type of drink prepared.

8. The method according to claim 5, comprising the step of adjusting a speed of rotation of the outlet tube by a control unit.

9. The method according to claim 5, comprising the step of cleaning and washing by flushing water through the outlet tube.

* * * * *